W. A. F. BLEECK.
PRIMARY BATTERY.
APPLICATION FILED MAR. 20, 1908.
899,823.  Patented Sept. 29, 1908.
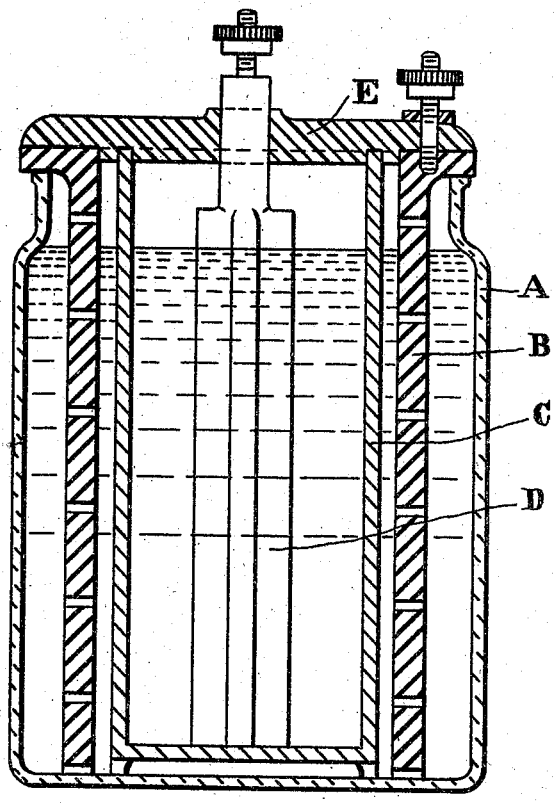

UNITED STATES PATENT OFFICE.

WILHELM ALEXANDER FELIX BLEECK, OF BRISBANE, QUEENSLAND, AUSTRALIA.

PRIMARY BATTERY.

No. 899,823.  Specification of Letters Patent.  Patented Sept. 29, 1908.

Application filed March 20, 1908. Serial No. 422,324.

*To all whom it may concern:*

Be it known that I, WILHELM ALEXANDER FELIX BLEECK, a citizen of Australia, residing at 284 and 286 Queen street, Brisbane, in the State of Queensland, Commonwealth of Australia, electrician, have invented new and useful Improvements in Primary Batteries, of which the following is a specification.

My invention relates to improved double fluid primary batteries consisting essentially of zinc as the positive element in a solution of sodium hydroxid (NaHO) as the excitant and carbon as the negative element in one of the depolarizing solutions hereinafter mentioned. The excitant is separated from the depolarizer by a porous partition which may take the well known and convenient form of a porous pot.

The solution of the excitant is made up by dissolving commercial sodium hydroxid in water in the proportion of about one part by weight of the hydroxid to two parts of water. I make up my depolarizing solutions by dissolving chromic acid in an aqueous solution of hydrogen peroxid ($H_2O_2$) and adding thereto hydrochloric acid (HCl). I find that very good results are obtained by using commercial chromic acid of good quality, 3% solution of hydrogen peroxid and commercial hydrochloric acid in the following proportions:—chromic acid 5 ounces by weight. Hydrogen peroxid (3% solution) 10 ounces by measure. Hydrochloric acid 5 ounces by measure. I must not, however, be taken as tying myself down to these proportions, as I find that good results are obtainable even when a wide departure is made therefrom.

In preparing my depolarizer I first dissolve a little of the chromic acid in a solution of hydrogen peroxid and hydrochloric acid whereupon a violent reaction takes place but at once subsides, and the remainder of chromic acid may be added without any further effervescence taking place.

In order that my invention may be thoroughly understood, I will now describe, by reference to the accompanying drawing, a convenient form in which my improved batteries may be put up.

Figure 1 in the drawing is a sectional illustration in which A is the outer containing vessel, made of glass, celluloid, or other suitable material. B is the carbon element, which is preferably made cylindrical in form, without bottom and provided at the top with a flange to sit upon and joint with the neck of the vessel A. The wall of the carbon cylinder is preferably perforated with small holes where immersed in the depolarizer, so as to facilitate the circulation of the solution. C is the porous pot made in the usual way, but preferably extending upwards sufficiently to joint with the cover E. D is the zinc element, of cruciform or other section affording a large surface, and is placed centrally in the porous pot C. The top and bottom of the porous pot are dipped for a short distance in melted paraffin wax. The carbon B and zinc D are provided with terminals as shown in the drawing for the purpose of making connections.

In making up a cell, the depolarizing solutions already described is placed in the vessel A. The carbon cylinder B is next put in place, after which the porous pot C is introduced and the excitant solution poured inside it. The zinc D is then inserted in the excitant and the cover E put on, so as to make a dust-proof joint with the pot C and flange of the carbon B.

Cells made up as above described yield a high voltage and are of low internal resistance. They are readily kept in working condition by renewing the excitant sodium hydroxid solution from time to time until the depolarizing solution becomes exhausted. When this happens a fresh depolarizing solution is made up and substituted for the exhausted solution.

Batteries of this kind, whether on closed or open circuit, are almost entirely free from noxious or objectionable fumes or gases, are particularly useful and efficient, since, in addition to their high electromotive force and low internal resistance, they possess a remarkable constancy which enables them to be employed with advantage in many cases where the ordinary primary batteries are unsuitable.

What I claim is:—

1. In primary batteries of the double fluid type the combination of sodium hydroxid as excitant with a depolarizer consisting of chromic acid dissolved in a solution of hydrogen peroxid with the addition of hydrochloric acid as described.

2. A double fluid primary battery consisting essentially of zinc as the positive element in a solution of sodium hydroxid as the excitant and of carbon as the negative element in a depolarizer consisting of chromic acid dissolved in a solution of hydrogen peroxid with the addition of hydrochloric acid, the depolarizer being separated from the excitant by a porous partition substantially as described.

In testimony whereof I have signed my name to this specification in the presence of two subscribing witnesses.

WILHELM ALEXANDER FELIX BLEECK.

Witnesses:
CHARLES S. WERNAP,
ALEXANDER ANDERSON.